United States Patent [19]
Togai

[11] Patent Number: 5,415,143
[45] Date of Patent: May 16, 1995

[54] IDLE CONTROL SYSTEM AND METHOD FOR MODULATED DISPLACEMENT TYPE ENGINE

[75] Inventor: Kazuhide Togai, Takatsuki, Japan

[73] Assignee: Mitsubishi Jidosha Kogyo Kabushiki Kaisha, Tokyo, Japan

[21] Appl. No.: 15,857

[22] Filed: Feb. 10, 1993

[30] Foreign Application Priority Data

Feb. 12, 1992 [JP] Japan .................. 4-025049

[51] Int. Cl.⁶ .................. F02D 41/16; F02D 45/00
[52] U.S. Cl. .................. 123/339.17; 123/481; 123/339.19; 123/339.22
[58] Field of Search .................. 123/198 F, 339, 481, 123/418

[56] References Cited

U.S. PATENT DOCUMENTS

| | | | |
|---|---|---|---|
| 4,398,520 | 8/1983 | Schulz et al. | 123/481 |
| 4,406,262 | 9/1983 | Ikeura | 123/339 |
| 4,494,502 | 1/1985 | Endo | 123/198 F |
| 4,520,272 | 5/1985 | Danno et al. | 290/40 A |
| 4,522,179 | 6/1985 | Nishimura et al. | 123/481 |
| 4,550,704 | 11/1985 | Barho et al. | 123/481 |
| 4,562,808 | 1/1986 | Tominaga et al. | 123/339 |
| 5,083,541 | 1/1992 | Chen | 123/339 |

FOREIGN PATENT DOCUMENTS

| | | | |
|---|---|---|---|
| 58-131337 | 5/1983 | Japan . | |
| 58-143143 | 8/1983 | Japan . | |
| 59-60048 | 4/1984 | Japan . | |
| 59-60049 | 4/1984 | Japan . | |
| 59-60050 | 4/1984 | Japan . | |
| 59-60051 | 4/1984 | Japan . | |
| 74347 | 4/1984 | Japan . | |
| 27740 | 2/1985 | Japan . | |
| 55345 | 3/1986 | Japan . | 123/481 |
| 3-213604 | 9/1991 | Japan . | |

OTHER PUBLICATIONS

"Patent Abstracts of Japan", vol. 007, No. 041 (M-194), Feb. 18, 1983, abstract of JP-A-57-191428.

"Patent Abstracts of Japan", vol. 008, No. 170 (M-315), Aug. 7, 1984, abstract of JP-A-59-065531.

*Primary Examiner*—Tony M. Argenbright

[57] ABSTRACT

An idle control system includes an engine speed determining unit, a unit for determining the number of operating cylinders, a valve stopping unit for stopping the operation of inlet and exhaust valves of some of the cylinders, an idle control parameter calculating unit, and an engine speed control unit. The idle control parameter calculating unit calculates at least a target idle speed and a target idle position as idle control parameters according to the data on the number of operating cylinders. The engine speed control unit controls an idle speed control valve so as to remove a deviation of an actual engine speed from the target engine speed, based on a target deviation compensating gain or a corrected target position obtained by a calculated position correcting unit. Thus, the idle control method performed by the idle control system allows the engine to operate stably even when the engine is switched to a partial operation from a full operation or vice versa and is subject to a sudden torque change during idling.

38 Claims, 11 Drawing Sheets

IDLE CONTROL SYSTEM AND METHOD FOR MODULATED DISPLACEMENT TYPE ENGINE

BACKGROUND OF THE INVENTION

1. Field of the Invention

This invention relates to an idle control system and an idle control method for an internal combustion engine in which cylinders are selectively operated by stopping inlet and exhaust valves of some cylinders, and more particularly to an idle control system for an internal combustion engine which includes an inlet-exhaust valve stopping mechanism so as to control an idling speed to a target value. This invention also relates to an idle control method for an engine such as a modulated displacement type engine.

2. Description of the Related Art

There is known an internal combustion engine which includes a valve stopping mechanism for temporarily and selectively interrupting supply of air and fuel to some cylinders so as to reduce an engine output or fuel cost. According to various operating data, a control unit causes the valve stopping mechanism to stop the operation of some of inlet and exhaust valves of cylinders and fuel-supply thereto once the engine is operating under a predetermined condition. When the engine deviates from the predetermined condition, the inlet and exhaust valves of the stopped cylinders become operative. Then, these cylinders receive fuel and resume their normal operation with their inlet and exhaust valves opened and closed.

Conventionally, an idle speed of the engine is controlled by adjusting the amount of air to be supplied to the engine or an air-to-fuel ratio, so that the idle speed does not change abruptly when load varies. A variety of methods have been proposed to prevent change of the idle speed.

Even when the amount of intake air or fuel is increased after detecting a reduction or variation in the engine speed, such intake air or fuel does not produce an effective torque until a certain period of time lapses. The engine response depends upon characteristics of various control devices.

In an engine in which two cylinders out of four cylinders can be stopped (this state is called "partial operation of the engine" hereinafter), an inlet stroke is halved (each time a crank shaft rotates 360 degrees), and the amount of inlet air is also halved. Table 1 shows the differences of response of various control units during the full operation of the engine (i.e. when all of the four cylinders are working), and during the partial operation of the engine. In Table 1, a 1.6-liter engine (3.6-liter in an inlet system) is in the full operation at an idle speed of 700 rpm, or is in the partial operation at an idle speed of 850 rpm.

TABLE 1

| Control units for | Response | |
|---|---|---|
| | 4 cylinders | 2 cylinders |
| Alternator | Time constant 100 ms | Time constant 100 ms |
| Ignition | After 1 stroke (43 ms) | After 2 strokes (70 ms) |
| Fuel (A/F) | After 3.5 strokes (150 ms) | 4.5 strokes (220 ms) |
| Amount of air (bi-path ISC) | Time constant 450 ms | Time constant 700 ms |

As can be seen from Table 1, during the partial operation of the engine, an interval of the output stroke is doubled, an equivalent capacity of the inlet system is doubled, and response of the air amount control unit is nearly halved. Furthermore, time constants for ignition timing control and fuel amount control are also increased while electric load control remains equal.

A control unit for an idle speed is designed to control various control parameters to be optimum during the full operation of the engine. Therefore, during its partial operation, the engine usually tends to suffer from reduced response and controllability, and an inconvenience such as overshooting. During the partial operation of the engine, the number of idle vibrations is half of the number of idle vibrations of the fully operating engine. The idle speed tends to be within a resonant range. There is a strong demand for preventing such a phenomenon.

SUMMARY OF THE INVENTION

It is therefore a first object of the invention to provide an idle control system which can assure stable idling of an engine of a modulated displacement type.

Another object of the invention is to provide an idle control method by utilizing the idle control system.

In a first aspect of the invention, there is provided an idle control system comprising: an engine speed sensor for outputting engine speed data; a unit for determining the number of operating cylinders and outputting determined data; an idle control parameter calculating unit for calculating at least a target engine speed and a target position as idle control parameters based on the data on the number of operating cylinders; an idle speed adjusting unit for adjusting an idle speed; and an engine speed control unit for controlling the idle speed adjusting unit so as to remove a deviation of the determined engine speed from the target engine speed.

This structure and arrangement of the idle control system can assure a stable idling of the engine even when the engine is switched to a partial operation or full operation of cylinders.

In a second aspect of the invention there is provided an idle control system comprising: an engine speed sensor for outputting engine speed data; a unit for determining the number of operating cylinders and outputting determined data; a cranking determining unit for determining actuation of the engine; an idle speed adjusting unit for adjusting an idle speed; a control range determining unit for determining whether the engine is in an engine-speed-feedback controllable range during its stable operation or in a non-engine-speed-feedback-controllable range during its astable operation; a maximum position-value calculating unit for calculating a maximum position value by comparing at least a target position calculated according to the number of operating cylinders and a target position calculated according to an inlet air temperature as idle control parameters and adopting the larger target position as a calculated target position when the control range determining unit determines that the engine is operating in the non-engine-speed-feedback-controllable range; a calculated position correcting unit for correcting the calculated position; a maximum engine speed calculating unit for calculating a maximum target engine speed by comparing at least a target engine speed calculated according to the number of operating cylinders and a target engine speed calculated according an engine water temperature as idle control parameters and adopting the larger target engine speed as a maximum target engine speed when the control range determining unit determines that the engine is operating in the engine-speed-feedback-controllable range; a target deviation correcting gain calculating unit for calculating a target deviation compensating gain according to a deviation of the calculated maximum target engine speed from the actual engine speed; and an engine speed control unit for controlling the idle speed adjusting unit according to the target deviation correcting gain or the corrected target position derived by the calculated position correcting unit.

The structure and arrangement of the second aspect of the invention can assure further stable idling of the engine even when the engine is switched from the full operation to the partial operation.

The idle control method of the invention is effective to control the engine of a modulated displacement type by utilizing the idle control system mentioned above.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
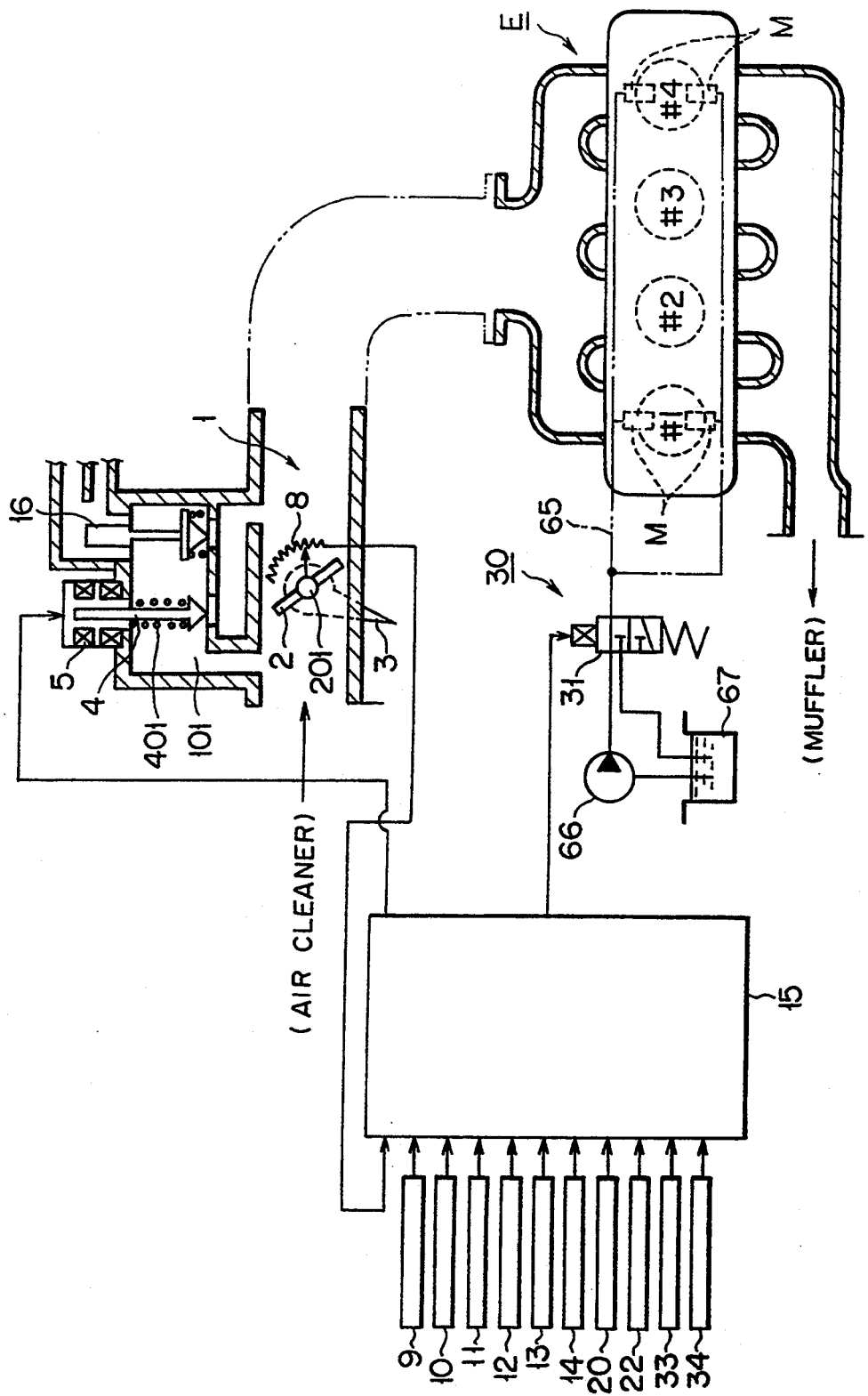
FIG. 1 shows the overall configuration of an idle control system for a modulated displacement type engine according to an embodiment of the present invention.

An idle control system and method for a modulated displacement type engine according to the present invention will be described with reference to a first embodiment shown in FIGS. 1 to 13.

In this embodiment, the idle control system and a method therefor are applied to a series 4-cylinder engine of a modulated displacement type (hereinafter called "engine E").

The engine E is assumed to be installed in an automatic transmission type motor vehicle with an air-conditioner. The engine E includes a throttle valve 2 in its air inlet path 1. A shaft 201 of the throttle valve 2 is connected to a throttle lever 3 outside the air inlet path 1.

The throttle lever 3 includes an accelerator cable (not shown) which turns the throttle valve 2 counterclockwise (in the plane of FIG. 1) via the throttle lever 3 when an accelerator pedal (not shown) is operated. The throttle valve 2 includes a dash pot (not shown) which urges to close the throttle valve 2. When tensile strength of the accelerator cable is reduced, the throttle valve 2 is made to close by the dash pot. The throttle valve also includes a throttle opening sensor 8 for outputting opening data of the throttle valve 2 and an idle switch 9 which is turned on when the throttle valve 2 is fully closed.

An idle speed control (ISC) valve 4 serving as an idle speed adjustor is disposed in an inlet bi-path 101 which detours the throttle valve 2. The ISC valve 4 is urged to be closed by a spring 401, and is driven by a stepper motor 5 serving as an actuator. A first idle air valve 16 automatically warms up the engine during idling in response to a cooling water temperature. The ISC valve 4 includes an ISC position sensor 10 for outputting data concerning opening of the ISC valve 4. An inlet air temperature sensor 34 is disposed in the inlet path 1 so as to output data on an inlet air temperature.

A cylinder block (not shown) includes a temperature sensor 11 for detecting a temperature of a cooling water as an engine temperature. An ignition coil (not shown) includes an engine speed sensor 12 for detecting an engine speed according to ignition pulses. A transmission system (not shown) includes a vehicle speed sensor 13 which detects a vehicle speed in the form of a pulse signal having a frequency proportional to the vehicle speed. The transmission system also includes a cranking switch 14 which serves as a cranking determining unit for detecting actuation of the engine. The cranking switch 14 usually remains off, and is turned on by the actuation of a self-starting motor.

The transmission system also includes an inhibitor switch 20, which is turned on when the motor vehicle is in the parking or neutral range, and is turned off when the motor vehicle is in the drive or reverse range.

The air conditioner (not shown) includes an air conditioner switch 22, which is turned on or off to activate or deactivate the air conditioner. In the engine E, a crank shaft (not shown) includes a crank angle sensor 33 to output crank angle data.

An engine control unit (ECU) 15 functions as a controller for receiving detected signals from the sensors 8 to 14, 20, 22, 33 and 34, and for providing the stepper motor 5 with control signals based on the received signals. Under the condition I in which the engine E is operating stably (with the idle switch 9 turned on), the ECU 15 performs engine speed feedback control in the engine-speed-feedback-controllable mode M-1. Under the condition II in which the engine is not stable, the ECU 15 performs non-engine-speed-feedback control in the non-engine-speed-feedback-controllable mode M-2. In the latter case, the ECU 15 performs non-engine-speed-feedback control for the ISC valve 4 in response to a signal from the ISC position sensor 10.

The condition I represents that the engine E is stably operating. For instance, the idle switch remains on for a certain period of time, the vehicle is running at a very low speed, a difference between an actual engine speed and the target engine speed is within a predetermined range, a certain period of time has elapsed after an air conditioner relay was switched on or off, and so on. The condition II represents a condition in which the foregoing condition I is not satisfied, i.e.-the engine E is not operating stably, and an urgent control operation is required.

The engine E includes inlet branch paths and exhaust branch paths which communicate with the four cylinders (cylinders #1 to #4). These branch paths are opened and closed by inlet and exhaust valves (not shown). The inlet and exhaust valves of the cylinders 2 and 3 are usually operable. The inlet and exhaust valves of the cylinder #1 and #4 are selectively opened and closed by a valve stopping mechanism M of a valve operating system.

The operation of the valve operating system including the valve stopping mechanism M will be described with reference to FIGS. 2 to 6. Since the valve stopping mechanisms for the inlet valves and exhaust valves have the same structure and arrangement, the valve stopping mechanism for the inlet valves will be exemplified hereinafter as an example, thereby simplifying the description.

A cam shaft (not shown) which is rotatable with the crank shaft of the engine E includes cams 40 for the respective cylinders. The cams 40 have a predetermined profile. A rocker shaft 41 is in parallel with the cam shaft, and includes main rocker arms 42 which confront with the inlet valve 47, and sub-rocker arms 59 which do not confront with the inlet valve 47. Each main rocker arm 42 and each sub-rocker arm 59 are juxtaposed with each other.

Figure 2:
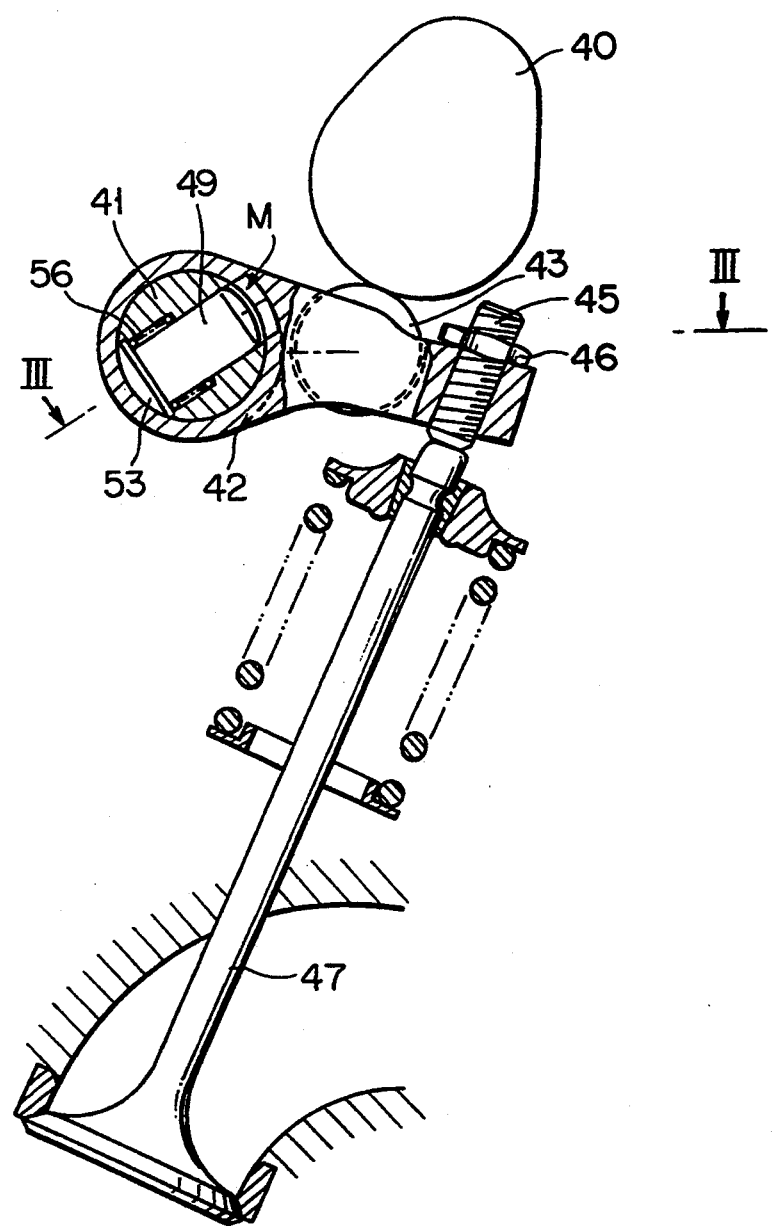
FIG. 2 is a partial sectional view of a main part of a valve operating unit to be used for the idle control system in an embodiment of the present invention.

The main rocker arm 42 is freely rotatable on the rocker shaft 41, and is made rotatable in unison with the rocker shaft 41 by the valve stopping mechanism M. An adjust screw 45 is fixed to an end of the main rocker arm 42 by a nut 46. The lower end of the main rocker arm 42 receives the upper end of the inlet valve 47. When rotated by the force of the rocker shaft 41, the main rocker arm 42 swings its end vertically as shown in FIG. 2, so that the inlet valve 47 is reciprocated via the adjust screw 45.

The sub-rocker arm 59 receives a shaft 44 at its arm. The shaft 44 rotatably supports the roller 43, which is in contact with the cam 40. In other words, the main rocker arm 42 receives a drive force from the cam 40 via the roller 43 and the shaft 44. The sub-rocker arm 59 which is rotatably supported on the rocker shaft 41 is made integral with the rocker shaft 41 by a half-moon-shaped key 60, so that the sub-rocker arm 59 always rotates with the rocker shaft 41.

The lower rocking end (i.e. roller 43) of the sub-rocker arm 59 is received on a cylinder head 63 via a piston 61 including a spring 62. After rocking, the sub-rocker arm 59 is pushed back by a force of the spring 62.

Thus, the rotation of the cam 40 allows the sub-rocker arm 59 to swing and the rocker shaft 41 to turn repeatedly.

Figure 5:
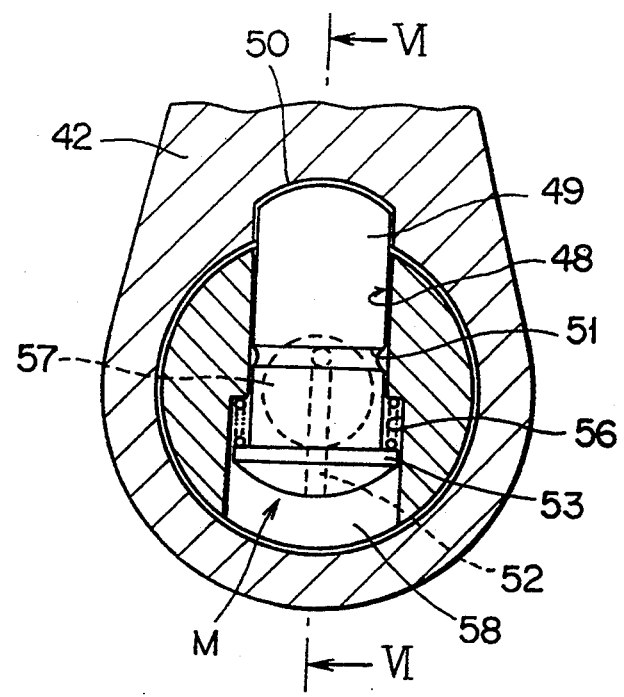
FIG. 5 is an enlarged sectional view showing that a valve stopping mechanism M of the valve operating unit is in operation.
Figure 6:
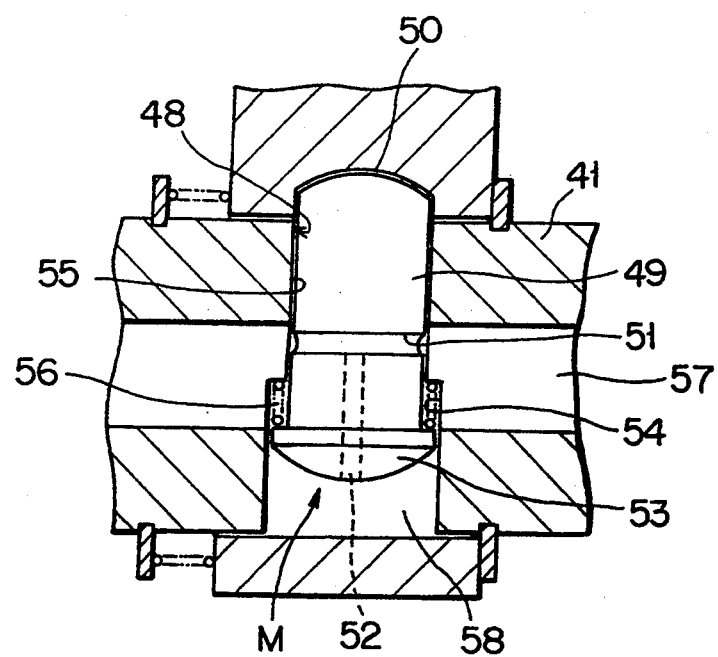
FIG. 6 is a sectional of the valve operating unit taken along line VI—VI in FIG. 5.

The valve stopping mechanism M has the following structure and arrangement. As shown in FIGS. 5 and 6, the main rocker arm 42 has a radially extending hole 48 at a position where the main rocker arm 42 is rotatably supported on the rocker shaft 41. A coupling pin 49 is inserted in the hole 48. The coupling pin 49 can project from the rocker shaft 41 by a hydraulic circuit 30. The main rocker arm 42 also has a hole 50 in its inner side at the position where the main rocker arm 42 is rotatably supported on the rocker shaft 41. The coupling pin 49 projects from the rocker shaft 41 and engages with the hole 50.

The coupling pin 49 has an oil groove 51 formed on its outer circumferential center. An oil gallery 52 is formed between the outer surface of the coupling pin 49 and an axial center thereof, and communicates the oil groove 51 with the bottom of the coupling pin 49. Oil is supplied to the end of the coupling pin 49 via the oil groove 51 and the oil gallery 52.

The coupling pin 49 has a flange 53 around its bottom. The hole 48 has a large diameter portion 54 through which the flange 53 slides, and a small diameter portion 55 through which the upper portion of the coupling pin 49 slides. A spring 56 is disposed around a step between the small diameter portion 55 and the large diameter portion 54 of the hole 48, and between the coupling pin 49 and the flange 53. Thus, the spring 56 urges the coupling pin 49 to stay at its regular position.

The valve stopping mechanism M is connected to the hydraulic circuit 30, which supplies a pressured oil to the valve stopping mechanism M via an oil gallery 57 extending axially in the rocker shaft 41. The valve stopping mechanism M is operated to engage or disengage the rocker shaft 41 and the main rocker arm 42.

The hydraulic circuit 30 includes a hydraulic pump 66 for supplying via an oil supply path 65 the pressured oil to an oil reservoir 58 and an oil gallery 57 located near the bottom of the coupling pin 49, and an electromagnetic valve 31 which is disposed in the oil supply path 65 so as to intermittently supply the pressured oil to the oil gallery 57.

The electromagnetic valve 31 assumes a first position to supply the pressured oil to the oil gallery 57 from the pump 66, and a second position to disconnect the oil gallery 57 from the hydraulic pump 66 and connect the oil gallery 57 with a low pressure oil tank 67. The operation of the electromagnetic valve 31 is controlled by a drive signal output by the ECU 15.

The valve stopping mechanisms M for the inlet and exhaust valves operate as described below.

When the engine E is working with its four cylinders (i.e. in full operation), the electromagnetic valve 31 stays at the first position shown by a solid line in FIG. 1, and supplies the pressured oil to the oil gallery 57 in the rocker shaft 41.

Figure 3:
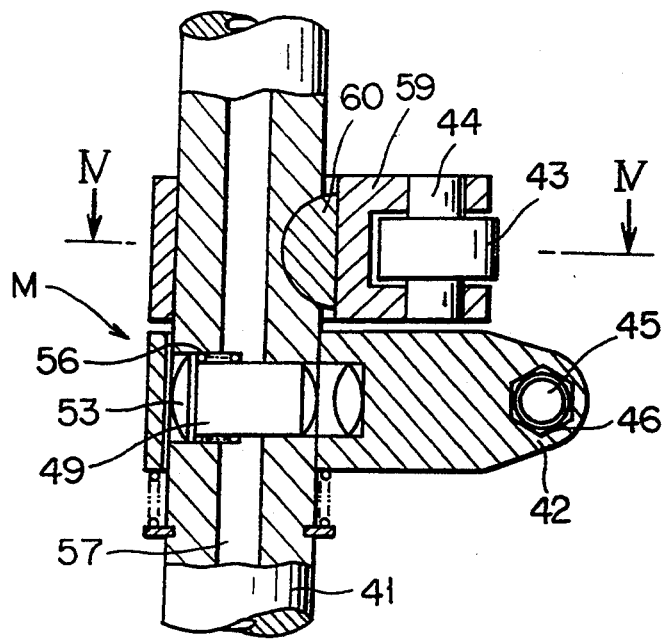
FIG. 3 is a sectional view of the valve operating unit taken along line III—III in FIG. 2.
Figure 4:
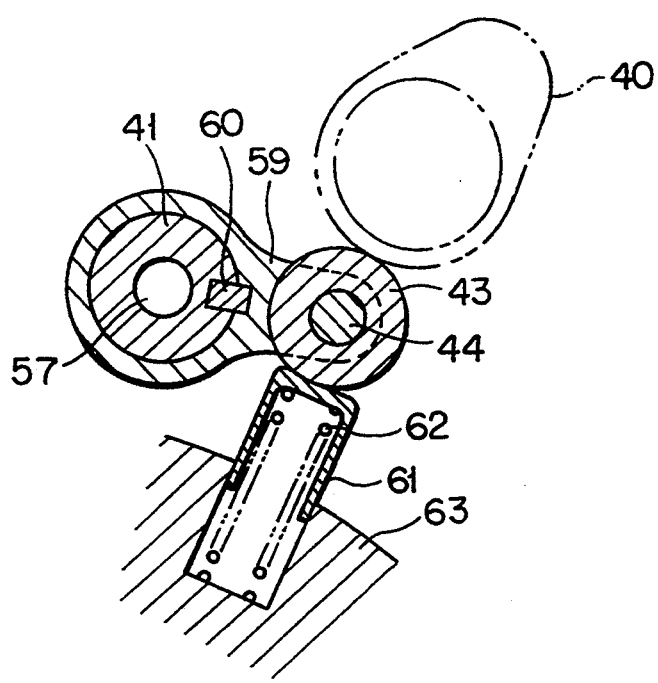
FIG. 4 is a sectional view of the valve operating unit taken along line IV—IV in FIG. 2.

Under this condition, the main rocker arm 42 and the rocker shaft 41 are integral with each other so as to rotate together as shown in FIGS. 3 and 4. The rocker shaft 41 is driven by the drive force from the cam 40 via the sub-rocker arm 59, so that the rocker shaft 41 actuates the inlet valve 47 in response to the drive force (depending upon the inlet cam lift) from the cam 40. Thus, the inlet valve 47 reciprocates according to the profile of the cam 40.

On the other hand, when the engine E is partially operating, the electromagnetic valve 31 stays at the second position, so that the pressured oil is returned to the oil tank 67 from the oil gallery 57.

The coupling pin 49 is returned into the rocker shaft 41 from the hole 50 by the force of the spring 56 shown in FIGS. 3 and 4.

Then, the main rocker arm 42 is freed from the rocker shaft 41, so that the movement of the rocker shaft 41 is not transmitted to the main rocker arm 42, and the inlet valve 47 remains inoperative. Thus, the cylinders 1 and 4 do not function since their inlet and exhaust valves are kept inoperative. In other words, the engine E operates partially.

In the foregoing description, the valve stopping mechanism M includes the main rocker arm 42, sub-rocker arm 59, and coupling pin 49 for engaging and disengaging the rocker shaft 41 with and from the main rocker arm 42. Alternatively, the valve stopping mechanism M may be of a conventional structure and arrangement in which valve pushing members (not shown) are slidably supported on respective rocker arms (not shown), and are moved to and from the inlet and exhaust valves so as to prevent the rocker arms from striking these valves when they are stopped.

The ECU 15 is a micro-computer, and controls not only fuel supply to the engine E, ignition timing, operation of the throttle valves but also full or partial operation of the engine E. For this purpose, the ECU 15 receives a unit crank angle signal $\Delta\theta$ from the crank angle sensor 33. The ECU 15 functions as a unit for determining the number of operating cylinders, and determines a signal #n indicating the number of operating cylinders-based on a drive signal of the electromagnetic valve 31. Furthermore, the ECU 15 functions as a cranking determining unit to output a cranking signal when the engine E is actuated.

In addition, the ECU 15 functions as an idle control parameter calculating unit A1, an engine speed control unit A2, a control range determining unit A3, a maximum position value calculating unit A4, a calculated position correcting unit A5, a maximum engine speed calculating unit A6, and a target deviation correcting gain calculating unit A7. The idle control method of an embodiment of the present invention is carried out by utilizing the foregoing functions.

Figure 7:
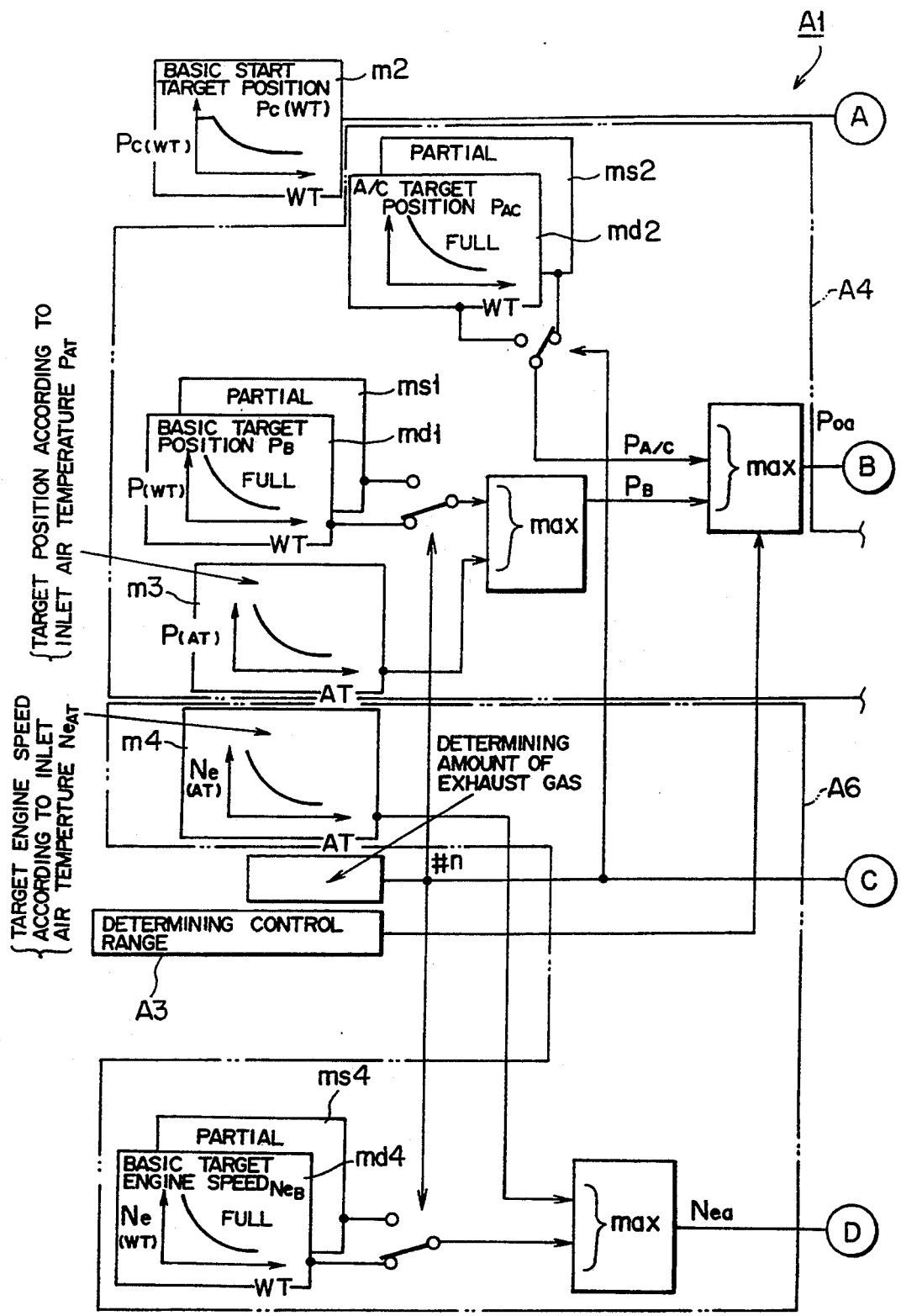
FIG. 7 is a block diagram of a part of the idle control system for an embodiment of the present invention.
Figure 8:
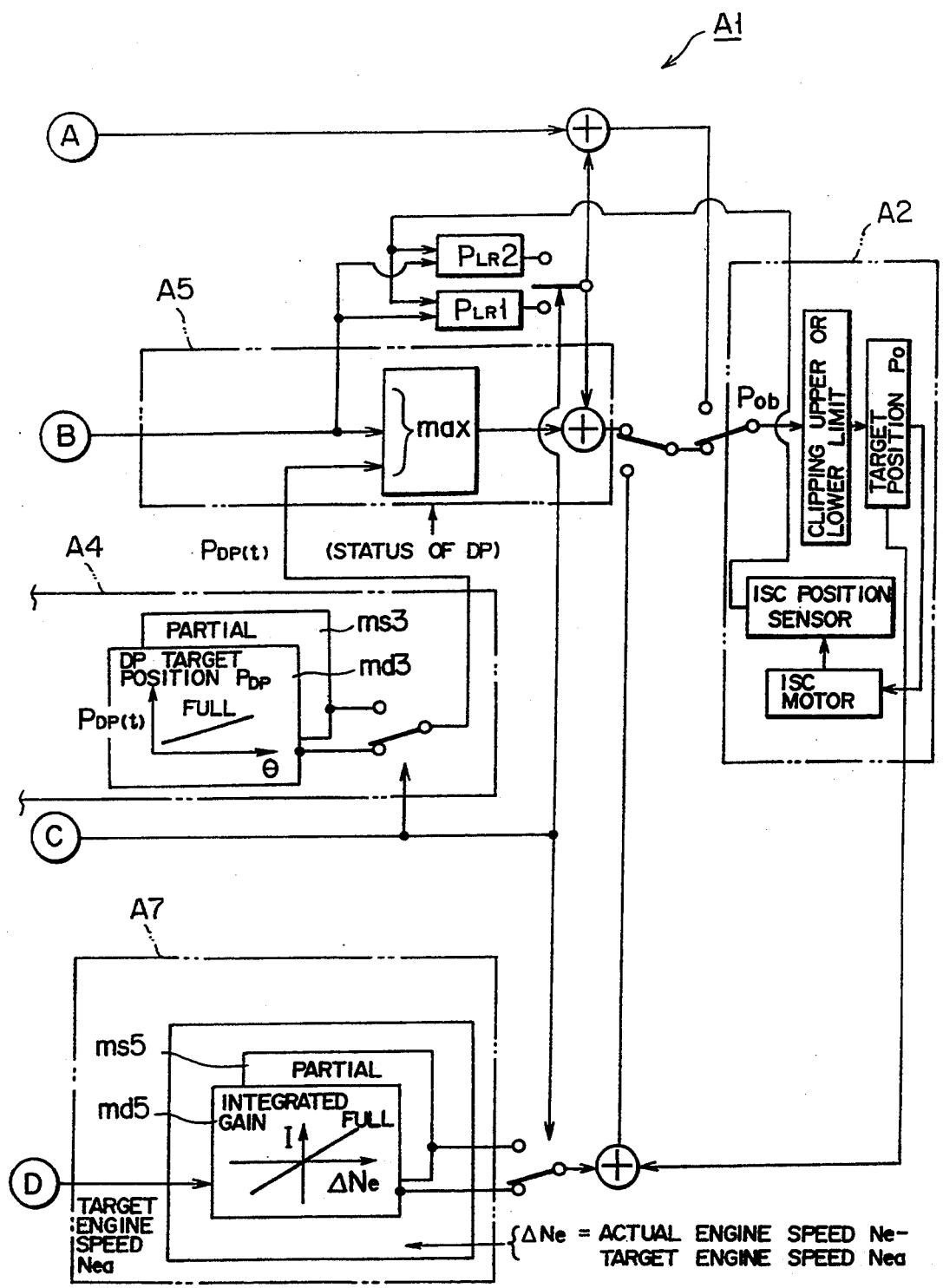
FIG. 8 is a view similar to FIG. 7, showing the other part of the idle control system for an embodiment of the present invention.

As shown in FIGS. 7 and 8, the idle control parameter calculating unit A1 calculates at least a target speed and a target position as the idle control parameters for the engine E based on the data #n on the number of operating cylinders (the signal indicating the number of operating cylinders).

The engine speed control unit A2 controls the ISC valve 4 so as to remove a deviation $\Delta Ne$ of an actual engine speed Ne from the target engine speed (e.g. a calculated target engine speed ($\Delta Ne$), or controls based on the target deviation correcting gain ($\Delta Ne$) or a corrected target position Pob derived by the calculated position correcting unit A5.

The control range determining unit A3 determines whether the engine E is in the engine-speed-feedback-controllable range M-1 or in the non-engine-speed-feedback-controllable range M-2. In the engine-speed-feedback-controllable range M-1 the engine E is operating stably, while in the non-engine-speed-feedback-controllable range M-2 the engine is operating astably.

When the engine E is operating in the non-engine-speed-feedback controllable range M-2, the maximum position value calculating unit A4 compares at least the target position ($P_{A/C}$) and a target position $P_{AT}$ calculated according to an inlet air temperature AT as the idle control parameters, and adopts the larger target position as the calculated position Poa.

The calculated position correcting unit A5 corrects the calculated position Poa.

When the engine E is found to be operating in the engine-speed-feedback-controllable range M-1, the maximum engine speed calculating unit A6 compares the target engine speed (e.g. basic target engine speed $Ne_B$) and the target engine speed $Ne_{AT}$ depending upon the inlet air temperature, and adopts the larger target engine speed as the calculated target engine speed Nea.

The target deviation correcting gain calculating unit A7 calculates the target deviation correcting gain I($\Delta Ne$) based on the deviation $\Delta Ne$ of the calculated target engine speed Nea from the actual engine speed Ne.

Figure 9:
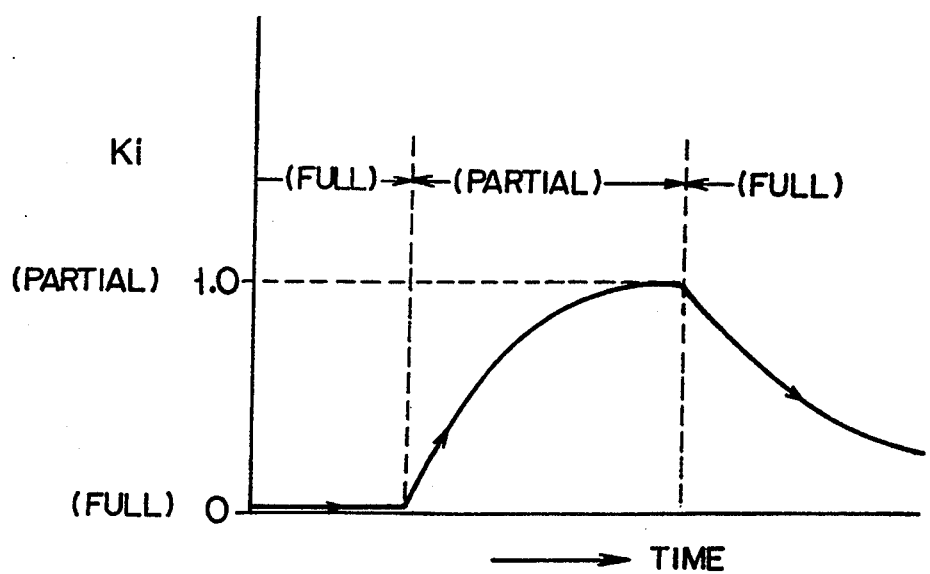
FIG. 9 is a graph showing a characteristic curve of an interpolation coefficient Ki with time to be used for the idle control system of FIG. 1.
Figure 10:
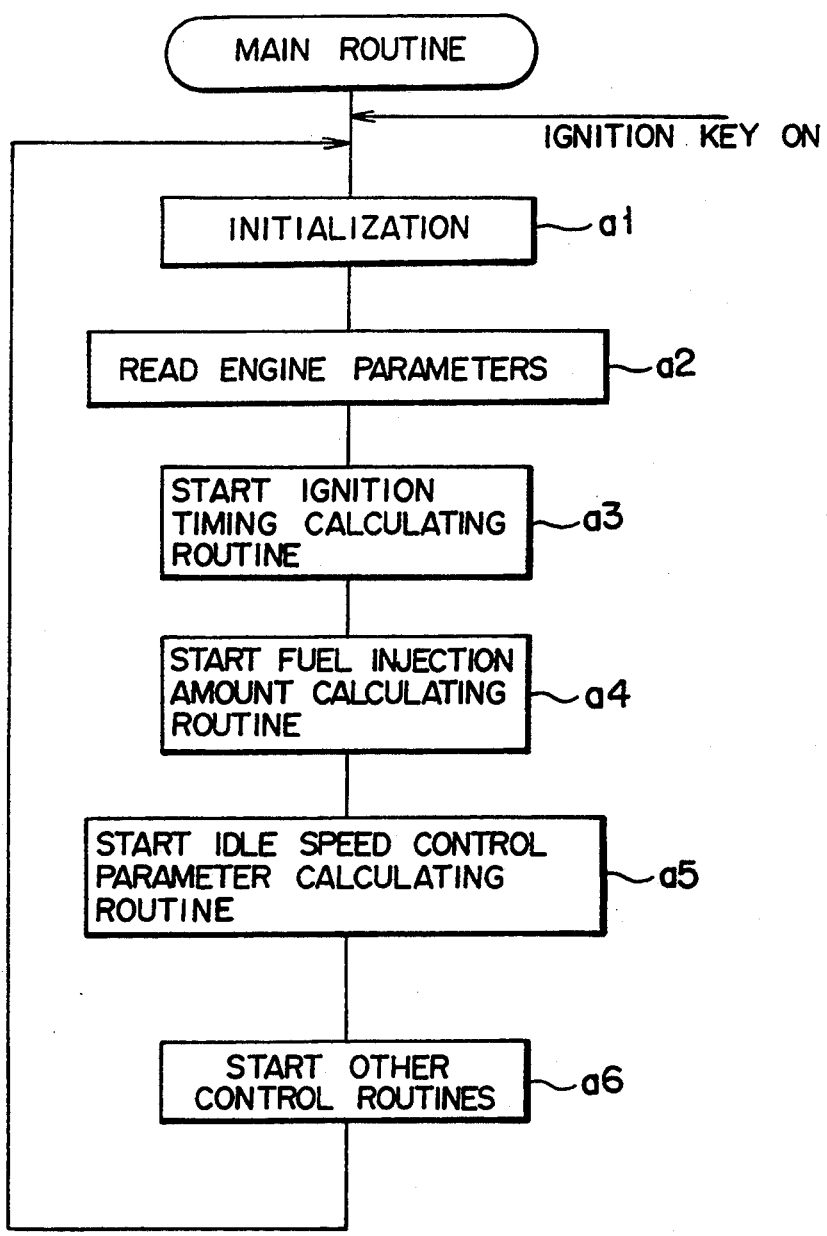
FIG. 10 is a flowchart of a main routine of the idle control system of FIG. 1.

The operation of the idle control system of FIG. 1 and the idle control method will be described hereinafter with reference to the control programs of the ECU 15 (shown in FIGS. 10 to 13) and the map for the interpolation coefficient Ki shown in FIG. 9.

The ECU 15 carries out the main routine when the engine E is activated. The ECU 15 performs initialization, sets flags, and reads data from various sensors. The ECU 15 calculates ignition timing in step a3, the amount of fuel injection in step a4, an extent of idle speed control in step a5 (to be described later), performs other processing in step a6, and returns to step a1. The control routine for the partial operation of the engine E (called "partial operation control routine") is carried out by interrupting the main routine as predetermined.

In the partial operation control routine, when a partial operation command for the engine E is received, the electromagnetic valve 31 returns the pressured oil from the oil gallery 57 to the low pressure oil tank 67 via the oil supply path 65 as shown in FIGS. 3 and 6. The coupling pin 49 is retracted into the rocker shaft 41 by the spring 56, the main rocker arm 42 is freed from the rocker shaft 41, and the inlet valves 47 for the cylinders #1 and #4 remain inoperative.

When the cylinders #1 and #4 are kept inoperative, a partial operation flag ICFLG is set. Initialization such as the setting of the partial operation flag ICFLG and clearing of other flags is carried out in step a1 of the main routine.

Figure 12:
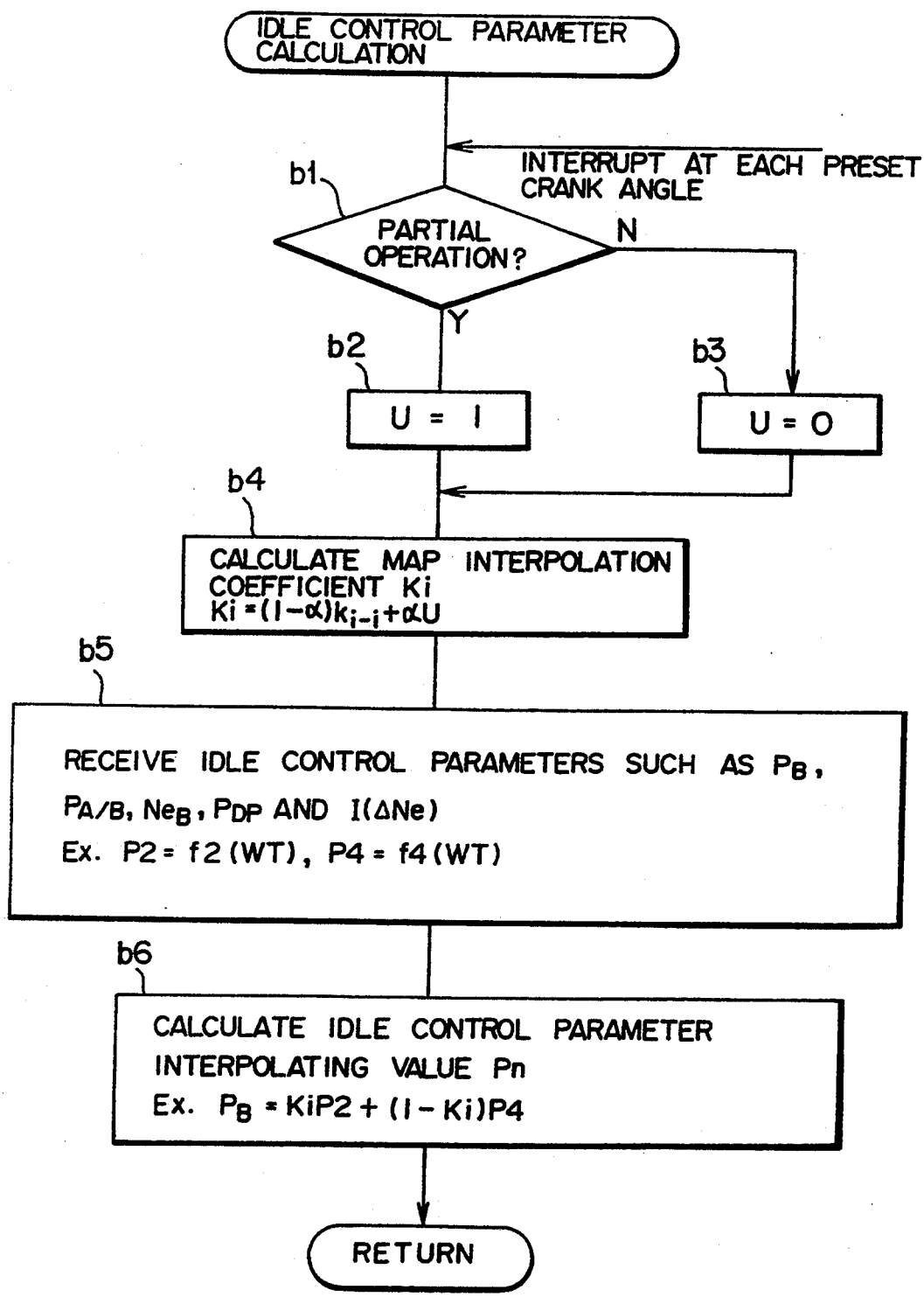
FIG. 12 is a flowchart of an idle control parameter calculating routine of the idle control system of FIG. 1.

During the main routine, interruption is made at each predetermined crank angle, and the ECU 15 carries out the idle control parameter calculating routine (FIG. 12). The ECU 15 checks an ON or OFF state of the partial operation flag ICFLG in step b1. When the flag ICFLG is ON, the ECU 15 sets a coefficient U to 1 (one). Otherwise, the ECU 15 sets the coefficient U to 0 (zero). Then, the ECU 15 advances to step b4, where the map interpolating coefficient Ki is calculated by using the following formula.

$$Ki = (1-\alpha)K_{i-1} + \alpha U \qquad (1)$$

where $\alpha$ is a value inherent to the engine and is $0 < \alpha \leq 1$. Thus, the map interpolating coefficient Ki increases as the control cycle elapses, and varies with time as shown in FIG. 9. In step b5, the ECU 15 calculates idle control parameters which are preliminarily set, and stores them in their associated areas. In this case, the ECU 15 calculates control parameters for the ON state of the partial operation flag ICFLG based on the partial operation map (shown at "msn" in FIGS. 7 and 8). The ECU 15 calculates control parameters for the OFF state of the partial operation flag ICFLG based on the full operation maps (shown at "mdn" in FIGS. 7 and 8). Thus, the latest control parameters are calculated for the basic target position $P_B$ (depending upon the water temperature), the air conditioner target position $P_{A/C}$ (depending upon the water temperature), the basic target engine speed $Ne_B$ (depending upon the water temperature), the target position $P_{DP}$ (depending upon the operation status of the dash pot, i.e. the unit crank angle $\theta$), and the target deviation correcting gain I($\Delta$Ne=actual engine speed Ne—calculated target engine speed Nea).

In step b6, the ECU 15 uses the formula (2) to calculate respective interpolation values Pn for the idle control parameters which have been calculated in step b5, according to the full or partial operation of the engine E.

$$Pn = KiP2 + (1-Ki)P4 \quad (2)$$

In response to increase or decrease of the map interpolation coefficient Ki, the interpolation value Pn gradually varies between P4 (=f4(WT)) for the full operation of the engine and P2 (=f2(WT)) for the partial operation of the engine, so that the hunting of the control operation can be prevented when the full operation of the engine is changed to the partial operation thereof, and vice versa.

Figure 13:
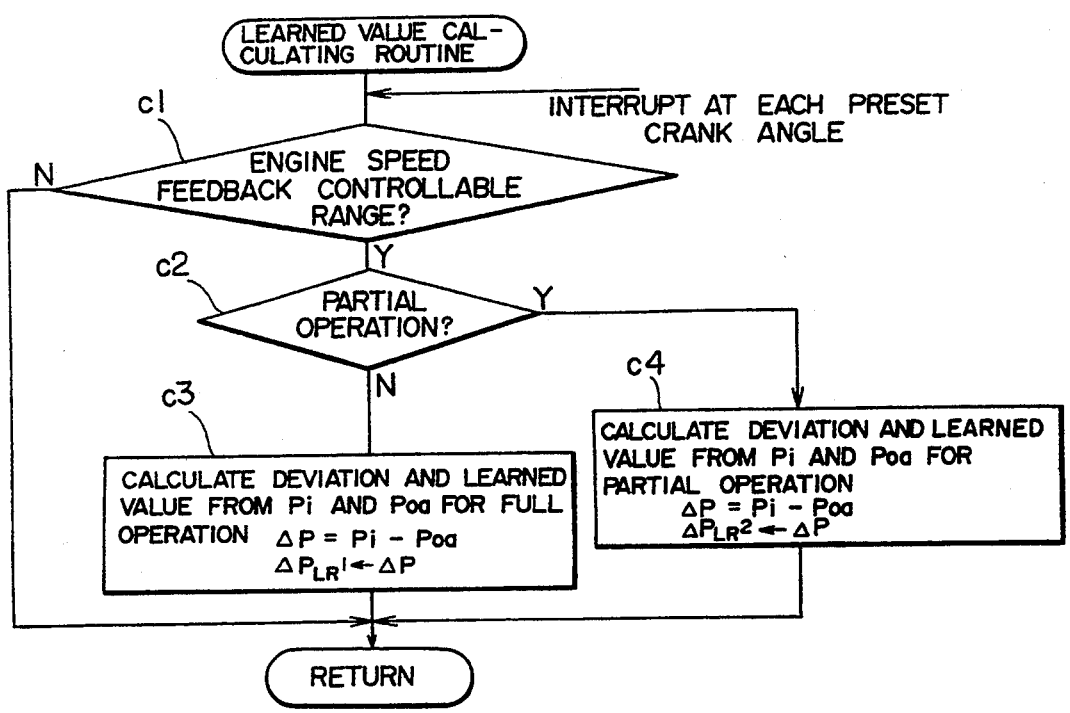
FIG. 13 is a flowchart of a learned value calculating routine of the idle control system of FIG. 1.

Furthermore, the main routine is interrupted for each predetermined crank angle so as to perform the learned value calculating routine as shown in FIG. 13.

In the learned value calculating routine, the ECU 15 determines, based on the actual engine operating data, whether the condition I is met and the engine E is operating in the engine-speed-feedback-controllable mode M-1. When the engine is not in the engine speed feedback controllable mode M-1, the ECU 15 returns to the initial state. When the engine is in engine-speed-feedback-controllable mode M-1, the ECU 15 advances to step c2. When the partial operation flag ICFLG is found to be ON in step c2, the ECU 15 advances to step c4. When the partial operation flag ICFLG is OFF (i.e. the engine is in the full operation), the ECU 15 advances to step c3. In step c4, the ECU 15 receives the actual position Pi for the partial engine operation from the ISC position sensor 10, renews the learned value $\Delta P_{LR}2$ based on a calculated deviation of the currently calculated position Poa from the ISC position sensor 10, and returns to the main routine. In step c3, the ECU 15 receives the actual position Pi for the full engine operation from the ISC position sensor 10, renews the learned value $\Delta P_{LR}1$ based on the deviation of the calculated position Poa from the actual position Pi, and returns to the main routine.

Figure 11:
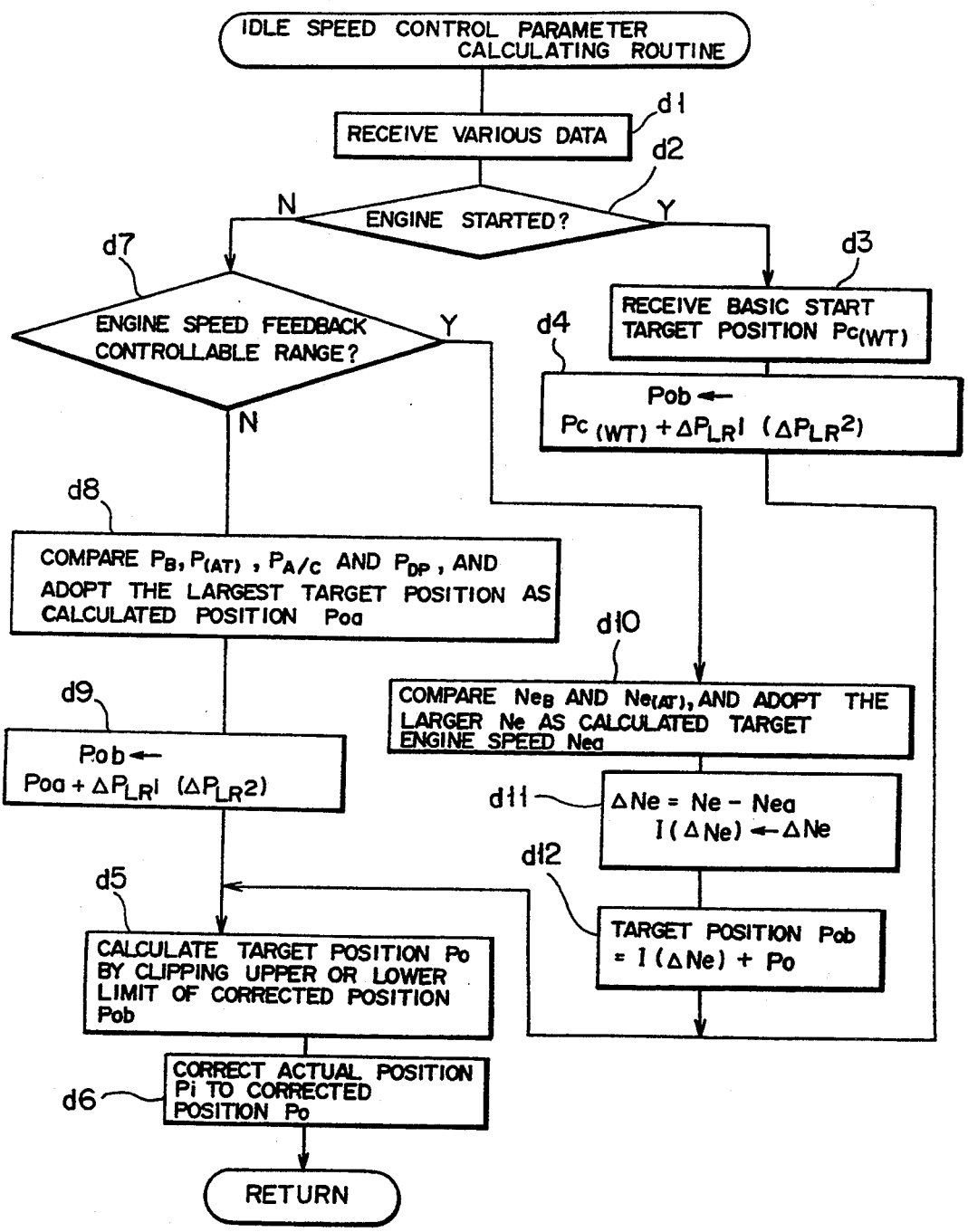
FIG. 11 is a flowchart of an idle speed control routine of the idle control system of FIG. 1.

The idle speed control value calculating routine in the main routine will be described with reference to FIG. 11.

In step d1, the ECU 15 receives various data such as idle control parameters and learned value $\Delta P_{LR}1$ or $\Delta P_{LR}2$. Then, the ECU 15 checks whether or not the cranking switch 14 is on or off. When the cranking switch 14 is on, the ECU 15 advances to step d3, and calculates a start basic target position $Pc_{(WT)}$ based on the map m2. In step d4, the ECU 15 corrects the start basic target position $Pc_{(WT)}$ by applying the learned value $\Delta_{LR}1$ (for the partial engine operation) or $\Delta_{LR}2$ (for the full engine operation) to the formula (3) so as to derive corrected target positions Pob, and goes to steps d5 and d6.

$$Pob = Pc_{(WT)} + \Delta P_{LR}1 (\text{or } \Delta P_{LR}2) \ldots \quad (3)$$

In step d5, the ECU 15 calculates the target potion Po by clipping the upper or lower limit of the corrected target position Pob, and performs the feedback control of the stepper motor 5 so as to correct the actual position Pi of the ISC valve 4 to the target position Po.

When the engine is found as not being actuated, the ECU 15 goes to step d7, where the ECU 15 serves as the control range determining unit A3, determines whether the condition II is satisfied, i.e. the engine is operating in the non-engine-speed-feedback controllable mode M-2, according to the actual engine operation data. When the engine is not in the non-engine-speed-feedback-controllable mode M-2, the ECU 15 advances to step d8. In step d8, the ECU 15 functions as the maximum position calculating unit A4, which calculates the maximum position Poa by receiving various data necessary for the non-engine-speed-feedback controllable mode M-2 such as the basic target position $P_B$ (from the maps ms1 and ms2), target position $P_{(AT)}$ according to the inlet air temperature (from the map m3), target position $P_{A/C}$ according to the operating status of the air conditioner (from the maps ms2 and md2), and target position $P_{DP}$ according to the operating status of the dash pot (from the maps ms3 and md3). In steps d9 and d5, the ECU 15 corrects the calculated position Poa based on the learned value $\Delta P_{LR}1$ for the partial engine operation or $\Delta P_{LR}2$ for the full engine operation, and obtains the corrected target positions Pob as desired. Then, the ECU 15 clips the upper or lower limit of the corrected target position Pob so as to derive the target position Po, and advances to step d6. In step d6, the ECU 15 performs the feedback control of the stepper motor 5 so as to correct the actual position Pi to the target position Po.

When the engine is found to be in the engine speed feedback controllable range M-1 in step d7, the ECU 15 advances to step d10. Then, the ECU 15 receives the basic target engine speed $Ne_B$ (from the maps ms4 and md4) and the target engine speed $Ne_{(AT)}$ according to the inlet air temperature (from the map m4), and adopts the larger target engine speed as a calculated target engine speed Nea. In other words, the ECU 15 functions as the calculated target engine speed calculating unit A6.

In steps d11 and d12, the ECU 15 calculates the deviation $\Delta$Ne of the actual engine speed Ne from the calculated target speed Nea, and determines the target deviation correcting gain I (from the maps ms5 and md5) for the full or partial operation of the engine. Then, the ECU 15 derives the necessary corrected target position Pob by adding the target deviation correcting gain I ($\Delta$Ne) and the actual target position Pob. The ECU 15 advances to steps d5 and d6, where the ECU 15 clips the upper or lower limit of the corrected target position Pob, calculates the latest target position Po, and performs the feedback control of the ISC valve 4 so as to correct the actual position Pi of the ISC valve 5 to the latest target position Po.

According to the embodiments of the present invention, at least idle speeds and target idle positions are respectively calculated according to the number of operating cylinders so as to control the idle speed adjusting unit by offsetting the deviation of the actual engine speed Ne from the target engine speed, i.e. calculated target engine speed Nea. These calculated values are selectively used to assure stable idling characteristics even when the full engine operation is changed to the partial engine operation.

As described, the idle control system and method for the embodiments of the present invention allow the idle control to be carried out by controlling the ISC valve, and is applicable to a modulated displacement type engine in which cylinders are selectively operated. The idle control system is especially advantageous when it is applied to a modulated displacement type engine in which cylinders are selectively operated to assure full engine operation or partial engine operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An idle control system for a modulated displacement type engine comprising:
   an engine speed sensor for outputting engine speed data;
   operating cylinder determining means for determining the number of operating cylinders and outputting determined data;
   idle control parameter calculating means for calculating at least a target engine speed and a target position as idle control parameters based on the data on the number of operating cylinders, wherein the idle control parameter calculating means calculates a basic target position according to an engine water temperature and the data on the number of operating cylinders;
   idle speed adjusting means for adjusting an idle speed; and
   engine speed control means for controlling the idle speed adjusting means so as to remove a deviation of the determined engine speed from the target engine speed.

2. An idle control system for a modulated displacement type engine, comprising:
   an engine speed sensor for outputting engine speed data;
   operating cylinder determining means for determining the number of operating cylinders and outputting determined data;
   idle control parameter calculating means for calculating at least a target engine speed and a target position as idle control parameters based on the data on the number of operating cylinders, wherein the idle control parameter calculating means calculates a target position according to an operating status of an air conditioner and the data on the number of operating-cylinders;
   idle speed adjusting means for adjusting an idle speed; and
   engine speed control means for controlling the idle speed adjusting means so as to remove a deviation of the determined engine speed from the target engine speed.

3. An idle control system for a modulated displacement type engine comprising:
   an engine speed sensor for outputting engine speed data;
   operating cylinder determining means for determining the number of operating cylinders and outputting determined data;
   idle control parameter calculating means for calculating at least a target engine speed and a target position as idle control parameters based on the data on the number of operating cylinders, wherein the idle control parameter calculating means calculates a target position according to an operating status of a dash pot and the data on the number of operating cylinders;
   idle speed adjusting means for adjusting an idle speed; and
   engine speed control means for controlling the idle speed adjusting means so as to remove a deviation of the determined engine speed from the target engine speed.

4. An idle control system for a modulated displacement type engine, comprising:
   an engine speed sensor for outputting engine speed data;
   operating cylinder determining means for determining the number of operating cylinders and outputting determined data;
   idle control parameter calculating means for calculating at least a target engine speed and a target position as idle control parameters based on the data on the number of operating cylinders, wherein the idle control parameter calculating means calculates a basic target engine speed according to an engine water temperature and the data on the number of operating cylinders;
   idle speed adjusting means for adjusting an idle speed; and
   engine speed control means for controlling the idle speed adjusting means so as to remove a deviation of the determined engine speed from the target engine speed.

5. An idle control system for a modulated displacement type engine, comprising:
   an engine speed sensor for outputting engine speed data;
   operating cylinder determining means for determining the number of operating cylinders and outputting determined data;
   idle control parameter calculating means for calculating at least a target engine speed and a target position as idle control parameters based on the data on the number of operating cylinders, wherein the idle control parameter calculating means calculates a target deviation compensating gain according to the data on the number of operating cylinders;
   idle speed adjusting means for adjusting an idle speed; and
   engine speed control means for controlling the idle speed adjusting means so as to remove a deviation of the determined engine speed from the target engine speed.

6. An idle control system for a modulated displacement type engine, comprising:
   an engine speed sensor for outputting engine speed data;
   operating cylinder determining means for determining the number of operating cylinders and outputting determined data;
   idle control parameter calculating means for calculating at least a target engine speed and a target position as idle control parameters based on the data on the number of operating cylinders, wherein the idle control parameters comprise a map which is set according to the data on the number of operating cylinders;
   idle speed adjusting means for adjusting an idle speed; and engine speed control means for controlling the idle speed adjusting means so as to remove a deviation of the determined engine speed from the target engine speed.

7. An idle control system of claim 6, wherein when the number of operating cylinders changes, new idle control parameters are interpolated from previous idle control parameters.

8. An idle control system of claim 7, wherein interpolation coefficients are calculated according to the data on the number of operating cylinders.

9. An idle control system for a modulated displacement type engine, comprising:

an engine speed sensor for outputting engine speed data;

operating cylinder determining means for determining the number of operating cylinders and outputting determined data;

idle control parameter calculating means for calculating at least a target engine speed and a target position as idle control parameters based on the data on the number of operating cylinders, wherein the idle control parameter calculating means calculates the idle control parameters for each first predetermined crank angle;

idle speed adjusting means for adjusting an idle speed; and engine speed control means for controlling the idle speed adjusting means so as to remove a deviation of the determined engine speed from the target engine speed.

10. An idle control system for a modulated displacement type engine, comprising:

an engine speed sensor for outputting engine speed data;

operating cylinder determining means for determining the number of operating cylinders and outputting determined data;

idle control parameter calculating means for calculating at least a target engine speed and a target position as idle control parameters based on the data on the number of operating cylinders, idle speed adjusting means for adjusting an idle speed, wherein during astable operation of the engine, the idle speed adjusting means is controlled according to the target position for a predetermined period of time after an additional unit connected to the engine is turned on or off; and engine speed control means for controlling the idle speed adjusting means so as to remove a deviation of the determined engine speed from the target engine speed.

11. An idle control system for a modulated displacement type engine, comprising:

an engine speed sensor for outputting engine speed data;

operating cylinder determining means for determining the number of operating cylinders and outputting determined data;

idle control parameter calculating means for calculating at least a target engine speed and a target position as idle control parameters based on the data on the number of operating cylinders;

idle speed adjusting means for adjusting an idle speed wherein during astable operation of the engine, the idle speed adjusting means is controlled according to the target engine speed after a predetermined period of time has passed following the turning on or off of an additional unit connected to the engine; and engine speed control means for controlling the idle speed adjusting means so as to remove a deviation of the determined engine speed from the target engine speed.

12. An idle control system for a modulated displacement type engine, comprising:

an engine speed sensor for outputting engine speed data;

operating cylinder determining means for determining the number of operating cylinders and outputting determined data;

cranking determining means for determining actuation of the engine;

idle speed adjusting means for adjusting an idle speed;

control range determining means for determining whether the engine is in an engine-speed-feedback controllable range during astable operation thereof or in a non-engine-speed-feedback-controllable range during an astable operation thereof;

maximum position value calculating means for calculating a maximum position value by comparing at least a target position calculated according to the number of operating cylinders and a target position calculated according to an inlet air temperature as idle control parameters and adopting the larger target position as a calculated target position when the control range determining means determines that the engine is operating in the non-engine-speed-feedback-controllable range;

calculated position correcting means for correcting the calculated position;

maximum engine speed calculating means for calculating a maximum target engine speed by comparing at least a target engine speed calculated according to the number of operating cylinders and a target engine speed calculated according to an engine water temperature as idle control parameters and adopting the larger target engine speed as a maximum target engine speed when the control range determining means determines that the engine is operating in the engine-speed-feedback-controllable range;

target deviation correcting gain calculating means for calculating a target deviation correcting gain according to a deviation of the calculated maximum target engine speed from the actual engine speed; and engine speed control means for controlling the idle speed adjusting means according to the target deviation correcting gain or the corrected target position derived by the calculated position correcting means.

13. An idle control system of claim 12, wherein the target positions comprise a basic target position set according to an engine water temperature, a target position set according to an operating status of an air conditioner, and a target position set according to an operating status of a dash pot.

14. An idle control system of claim 12, wherein the target engine speed comprises a basic target engine speed set according to an engine water temperature.

15. An idle control system of claim 12, wherein the target deviation correcting gain is calculated according to the data on the number of operating cylinders.

16. An idle control system of claim 12, wherein the calculated position correcting means obtains a corrected target position by adding the calculated position and a learned value calculated by learned value calculating means according to the calculated position.

17. An idle control system of claim 16, wherein the learned value calculating means calculates learned values of the corrected target position according to a deviation of an actual position of the idle speed adjusting means from the basic target position when the engine is recognized to be operating in the engine speed feedback controllable range.

18. An idle control system of claim 17, wherein the learned value is set according to the data on the number of operating cylinders.

19. An idle control system of claim 18, wherein the learned value is calculated for each predetermined crank angle.

20. An idle control method for controlling a modulated displacement type engine, comprising the steps of:
    (a) detecting an engine speed;
    (b) determining the number of operating cylinders;
    (c) calculating at least a target engine speed and a target position as idle control parameters based on the data on the number of operating cylinders wherein said step (c) calculates a basic target position according to an engine water temperature and the data on the number of operating cylinders; and
    (d) controlling idle speed adjusting means so as to remove a deviation of the detected engine speed from the target engine speed.

21. An idle control method for controlling a modulated displacement type engine, comprising the steps of:
    (a) detecting an engine speed;
    (b) determining the number of operating cylinders;
    (c) calculating at least a target engine speed and a target position as idle control parameters based on the data on the number of operating cylinders, wherein said step (c) calculates a target position according to an operating status of an air conditioner and the data on the number of operating cylinders; and
    (d) controlling idle speed adjusting means so as to remove a deviation of the detected engine speed from the target engine speed.

22. An idle control method for controlling a modulated displacement type engine comprising the steps of:
    (a) detecting an engine speed;
    (b) determining the number of operating cylinders;
    (c) calculating at least a target engine speed and a target position as idle control parameters based on the data on the number of operating cylinders, wherein said step (c) calculates a target position according to an operating status of a dash pot and the data on the number of operating cylinders; and
    (d) controlling idle speed adjusting means so as to remove a deviation of the detected engine speed from the target engine speed.

23. An idle control method for controlling a modulated displacement type engine comprising the steps of:
    (a) detecting an engine speed;
    (b) determining the number of operating cylinders;
    (c) calculating at least a target engine speed and a target position as idle control parameters based on the data on the number of operating cylinders, wherein said step (c) calculates a basic target engine speed according to an engine water temperature and the data on the number of operating cylinders; and
    (d) controlling idle speed adjusting means so as to remove a deviation of the detected engine speed from the target engine speed.

24. An idle control method for controlling a modulated displacement type engine comprising the steps of:
    (a) detecting an engine speed;
    (b) determining the number of operating cylinders;
    (c) calculating at least a target engine speed and a target position as idle control parameters based on the data on the number of operating cylinders, wherein said step (c) calculates a target deviation compensating gain according to the data on the number of operating cylinders; and
    (d) controlling idle speed adjusting means so as to remove a deviation of the detected engine speed from the target engine speed.

25. An idle control method for controlling a modulated displacement type engine, comprising the steps of:
    (a) detecting an engine speed;
    (b) determining the number of operating cylinders;
    (c) calculating at least a target engine speed and a target position as idle control parameters based on the data on the number of operating cylinders, wherein the idle control parameters comprise a map which is set according to the data on the number of operating cylinders used for calculating at least said target engine speed and said target position at said step (c); and
    (d) controlling idle speed adjusting means so as to remove a deviation of the detected engine speed from the target engine speed.

26. An idle control method of claim 25, wherein when the number of operating cylinders changes, new idle control parameters are interpolated from previous idle control parameters for calculating at least said target engine speed and said target position at said step (c).

27. An idle control method of claim 26, wherein said step (c) calculates interpolation coefficients according to the data on the number of operating cylinders.

28. An idle control method for controlling a modulated displacement type engine, comprising the steps of:
    (a) detecting an engine speed;
    (b) determining the number of operating cylinders;
    (c) calculating at least a target engine speed and a target position as idle control parameters based on the data on the number of operating cylinders, wherein said step (c) calculates the idle control parameters for each first predetermined crank angle; and
    (d) controlling idle speed adjusting means so as to remove a deviation of the detected engine speed from the target engine speed.

29. An idle control method for controlling a modulated displacement type engine, comprising the steps of:
    (a) detecting an engine speed;
    (b) determining the number of operating cylinders;
    (c) calculating at least a target engine speed and a target position as idle control parameters based on the data on the number of operating cylinders; and
    (d) controlling idle speed adjusting means so as to remove a deviation of the detected engine speed from the target engine speed, wherein during astable operation of the engine, said step (d) controls the idle speed adjusting means according to the target position for a predetermined period of time after an additional unit connected to the engine is turned on or off.

30. An idle control method for controlling a modulated displacement type engine, comprising the steps of:
(a) detecting an engine speed;
(b) determining the number of operating cylinders;
(c) calculating at least a target engine speed and a target position as idle control parameters based on the data on the number of operating cylinders; and
(d) controlling idle speed adjusting means so as to remove a deviation of the detected engine speed from the target engine speed, wherein during astable operation of the engine, said step (d) controls the idle speed adjusting means according to the target engine speed after a predetermined period of time has passed following the turning on or off of an additional unit connected to the engine.

31. An idle control method for a modulated displacement type engine, comprising steps of:
(a) detecting an engine speed;
(b) determining the number of operating cylinders and outputting determined data;
(c) determining actuation of the engine;
(d) determining whether the engine is in an engine-speed-feedback controllable range during a stable operation thereof or in a non-engine-speed-feedback-controllable range during an astable operation thereof;
(e) calculating a maximum position value by comparing at least a target position calculated according to the number of operating cylinders and a target position calculated according to an inlet air temperature as idle control parameters and adopting the larger target position as a calculated target position when said step (d) determines that the engine is operating in the non-engine-speed-feedback-controllable range;
(f) correcting the calculated position to derive a corrected target position;
(g) calculating a maximum target engine speed by comparing at least a target engine speed calculated according to the number of operating cylinders and a target engine speed calculated according to an engine water temperature as idle control parameters and adopting the larger target engine speed as a maximum target engine speed when said step (d) determines that the engine is operating in the engine-speed-feedback-controllable range;
(h) calculating a target deviation correcting gain according to a deviation of the calculated maximum target engine speed from the actual engine speed; and
(i) controlling idle speed adjusting means according to the target deviation correcting gain or the corrected target position derived at said step (f).

32. An idle control method of claim 31, wherein the target positions used for calculating said maximum position value at said step (e) comprise a basic target position set according to an engine water temperature, a target position set according to an operating status of an air conditioner, and a target position set according to an operating status of a dash pot.

33. An idle control method of claim 31, wherein the target engine speed comprises a basic target engine speed set according to an engine water temperature for calculating said maximum position value at said step (c).

34. An idle control method of claim 31, wherein said step (h) calculates the target deviation correcting gain according to the data on the number of operating cylinders.

35. An idle control method of claim 31, wherein said step (f) calculates said corrected target position by adding the calculated position and a learned value calculated by learned value calculating means according to the calculated position.

36. An idle control method of claim 35, wherein said step (f) calculates learned values of the corrected target position by said learned value calculating means according to a deviation of an actual position of the idle speed adjusting means from a basic target position when the engine is determined to be operating in the engine speed feedback controllable range by said step (d).

37. An idle control method of claim 36, wherein said step (f) sets the learned value according to the data on the number of operating cylinders.

38. An idle control method of claim 37, wherein said step (f) calculates the learned value for each predetermined crank angle.

* * * * *